United States Patent
Hesselink (10) Patent No.: US 10,019,741 B2
(45) Date of Patent: Jul. 10, 2018

(54) METHODS AND SYSTEMS FOR A PERSONAL MULTIMEDIA CONTENT ARCHIVE

(75) Inventor: Lambertus Hesselink, Atherton, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 1600 days.

(21) Appl. No.: 12/853,239

(22) Filed: Aug. 9, 2010

(65) Prior Publication Data
US 2012/0036041 A1    Feb. 9, 2012

(51) Int. Cl.
*G06Q 30/00*    (2012.01)
*G06Q 30/06*    (2012.01)

(52) U.S. Cl.
CPC ......... *G06Q 30/06* (2013.01); *G06Q 30/0607* (2013.01)

(58) Field of Classification Search
CPC .......................................... G06Q 30/06–30/08
USPC ........................................ 705/26, 26.1–27.2
See application file for complete search history.

(56) References Cited

U.S. PATENT DOCUMENTS

| | | | |
|---|---|---|---|
| 5,649,185 A * | 7/1997 | Antognini et al. ............... | 726/2 |
| 6,499,054 B1 | 12/2002 | Hesselink et al. | |
| 6,732,158 B1 | 5/2004 | Hesselink et al. | |
| 6,799,274 B1 | 9/2004 | Hamlin | |
| 6,853,731 B1 | 2/2005 | Boyle et al. | |
| 6,950,441 B1 | 9/2005 | Kaczmarczyk et al. | |
| 6,978,348 B2 * | 12/2005 | Belknap et al. .............. | 711/118 |
| 7,027,716 B1 | 4/2006 | Boyle et al. | |
| 7,106,947 B2 | 9/2006 | Boyle et al. | |
| 7,120,692 B2 | 10/2006 | Hesselink et al. | |
| 7,292,775 B1 | 11/2007 | Boyle et al. | |
| 7,426,329 B2 | 9/2008 | Calhoon et al. | |
| 7,444,388 B1 | 10/2008 | Svendsen | |
| 7,454,443 B2 | 11/2008 | Ram et al. | |
| 7,467,187 B2 | 12/2008 | Hesselink et al. | |
| 7,487,312 B2 | 2/2009 | Paveza et al. | |
| 7,499,938 B2 | 3/2009 | Collart | |

(Continued)

OTHER PUBLICATIONS

Quantum Data, Inc., "Designing CEC into your next HDMI Product", http://www.hdmi.org/pdf/whitepaper/DesigningCECintoYourNextHDMIProduct.pdf.

(Continued)

*Primary Examiner* — Ethan D Civan
(74) *Attorney, Agent, or Firm* — Knobbe, Martens, Olson & Bear, LLP (57) ABSTRACT

The embodiments provide for legally transferring multimedia content stored on a medium to a personal content archive device. The device is configured to consolidate a user's content into a single device or secured storage that allows easy access to the content while preserving the digital rights of the content. When a content medium has been provided, the device queries a registration service over a network, such as the Internet, to register the content and indicate that it was legitimately obtained. The device may then be authorized to download and store an authorized version of the content into its secured storage. The authorized version may be the same or a variation of the registered content. The content may then be downloaded from one or more content sources. The registration process may be based on several criteria, such as an authenticity check of the medium, a fee payment, and the like.

22 Claims, 7 Drawing Sheets

(56) References Cited

U.S. PATENT DOCUMENTS

| | | |
|---|---|---|
| 7,546,353 B2 | 6/2009 | Hesselink et al. |
| 7,577,677 B2 | 8/2009 | Collart |
| 7,587,446 B1 | 9/2009 | Onyon et al. |
| 7,587,467 B2 | 9/2009 | Hesselink et al. |
| 7,600,036 B2 | 10/2009 | Hesselink et al. |
| 7,653,761 B2 | 1/2010 | Juster et al. |
| 7,730,132 B2 * | 6/2010 | Ludwig et al. ............... 709/204 |
| 7,735,145 B2 | 6/2010 | Kuehnel et al. |
| 7,770,025 B2 | 8/2010 | Bobrow |
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 2001/0029583 A1 | 10/2001 | Palatov et al. |
| 2001/0042170 A1 * | 11/2001 | Belknap et al. ............... 711/118 |
| 2002/0166035 A1 * | 11/2002 | Belknap et al. ............... 711/161 |
| 2005/0144195 A1 | 6/2005 | Hesselink et al. |
| 2005/0144200 A1 | 6/2005 | Hesselink et al. |
| 2005/0210101 A1 | 9/2005 | Janik |
| 2005/0281470 A1 * | 12/2005 | Adams .......................... 382/232 |
| 2006/0245725 A1 | 11/2006 | Lim |
| 2007/0055982 A1 | 3/2007 | Spilo |
| 2007/0056013 A1 | 3/2007 | Duncan |
| 2007/0174140 A1 * | 7/2007 | Noonan et al. ................. 705/27 |
| 2007/0250193 A1 * | 10/2007 | Raines et al. ................... 700/94 |
| 2008/0152305 A1 | 6/2008 | Ziegler |
| 2008/0199006 A1 | 8/2008 | Gandolph et al. |
| 2008/0249874 A1 * | 10/2008 | Seo ................................. 705/14 |
| 2009/0094160 A1 | 4/2009 | Webster et al. |
| 2009/0169020 A1 | 7/2009 | Sakthikumar et al. |
| 2009/0249420 A1 | 10/2009 | Kim et al. |
| 2009/0282462 A1 | 11/2009 | Skaria et al. |
| 2010/0011351 A1 | 1/2010 | Tsvi et al. |
| 2010/0030867 A1 * | 2/2010 | Yao ............................... 709/215 |
| 2010/0318417 A1 * | 12/2010 | Brisebois et al. ......... 705/14.37 |
| 2012/0036041 A1 | 2/2012 | Hesselink |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0169921 A1 | 6/2014 | Carey |
| 2014/0173215 A1 | 6/2014 | Lin et al. |

OTHER PUBLICATIONS

"Technological Protection Systems for Digitized Copyrighted Works: A Report to Congress," Teach Act Report by USPTO, May 20, 2003.

Chinese Office Action dated Jun. 5, 2015 from Chinese Application Serial No. 201110227683.0, 12 pages.

* cited by examiner

METHODS AND SYSTEMS FOR A PERSONAL MULTIMEDIA CONTENT ARCHIVE

BACKGROUND

Today, consumers own content, such as music, video, movies, etc., in a bewildering array of digital and analog content formats, ranging from VHS tape, phonographs, CDs, DVDs, and BluRay discs (BDs) to various digital file formats stored on hard drives, iPods, iPads, mobile phones, MP3 players, digital TVs with set top boxes, USB memory sticks, compact flash cards, and the like. Unfortunately, this plethora of formats and devices is complicated and makes it difficult for user's to enjoy their content. For example, many users would prefer to be able to have their content consolidated to a single location and used on multiple different devices.

However, commercially available multimedia content is protected by copyrights. The content providers also employ strong measures in preventing pirate copying of media like CDs, DVDs, BDs and other media, etc. This leads to some of the devices of a user unable to read such protected content items stored on optical discs or magnetic disks. Another limitation is that these protection schemes prevent a user from creating backup copies for personal use or for use on a different device.

It is therefore desirable to have a solution for allowing users to aggregate their multimedia content and provide a way for them to legitimately duplicate their content, if desired.

SUMMARY

In an embodiment, a personal archive device may comprise a secured storage, a storage controller, and an I/O interface that may interact with another device, such as, a general-purpose computer having a network connection and running software that communicates with a registration service on behalf of the personal archive device. In such an embodiment, the computer may interface with the registration service to obtain permission for obtaining authorized versions of content that can be downloaded into the secured storage of the personal archive device. In such an embodiment, the computer serves merely as a conduit for the download and the authorized version transparently passes through the computer to the secured storage such that no copy of the content is made on the computer. Alternatively, any copies made on the computer may be removed, destroyed, or rendered otherwise unusable as part of the download process to the secured storage to ensure that the personal archive device is the only receptacle of the authorized versions of content. The storage controller of the personal archive device may provide secured access to the secured storage so that the authorized versions of a user's multimedia content remain protected by a digital rights management scheme and various copy protection measures.

In accordance with another embodiment, a personal content archive device may comprise additional capabilities in addition to its secured storage and is configured to consolidate multimedia content for a user. In such an embodiment, the personal archive device comprises: an input for receiving a signal indicating when multimedia content stored on a medium has been received; a secured storage configured to protect information based on at least one digital rights management scheme; a network interface capable of communicating with a registration service over a network; and a processor, configured by instructions, to recognize receipt of the multimedia content medium based on the signal from the input, register the multimedia content medium with the registration service, and request download of an authorized version of the multimedia content into the secured storage.

In accordance with another embodiment, a system consolidates content of a user onto a personal content archive device. The system comprises a registration service configured to register multimedia content that has been obtained by the user; a secured storage coupled to a personal content archive device. The personal content archive device is configured to communicate with the registration service, query the registration service upon detecting input of a medium obtained by the user on which multimedia content has been stored, and register the multimedia content that has been obtained by the user with the registration service, wherein the personal archive device is configured to download an authorized version of the multimedia content to the secured storage coupled to the personal archive device based on the registration of the multimedia content.

In accordance with another embodiment, a method is provided for legitimately transferring multimedia content from a physical medium to a personal archive device. The method comprises recognizing an input of the multimedia content medium that has been obtained by the user; registering, by the personal archive device, the multimedia content with a registration service; and selectively downloading an authorized version of the multimedia content into a secured storage coupled to the personal archive device based on the registration of the multimedia content, wherein the authorized version stored in the secured storage is protected by a digital rights management scheme.

Additional features of the embodiments will be set forth in part in the description which follows, and in part will be obvious from the description, or may be learned by practice of the embodiments. The advantages of the embodiments can be realized and attained by means of the elements and combinations particularly pointed out in the appended claims. It is to be understood that both the foregoing general description and the following detailed description are exemplary and explanatory only and are not restrictive of the embodiment, as claimed.

BRIEF DESCRIPTION OF THE DRAWINGS

The accompanying drawings, which are incorporated in and constitute a part of this specification, illustrate embodiments of the invention and together with the description, serve to explain the principles of the embodiments. In the Figures.

DESCRIPTION OF THE EMBODIMENTS

The embodiments of the present invention provide systems and methods for essentially transferring, in an authorized or legal manner, multimedia content stored on a physical medium, such as movies on an optical medium like a DVD or BD, to a personal content archive device. The personal archive device comprises a secured storage for content and allows a user to consolidate his or her multimedia content into a single archive to easily allow access to the multimedia content while preserving the digital rights and copy protection features desired by the content's providers. In addition, in some embodiments, the personal archive device may comprise components, such as a display, user interface, control buttons, etc. to serve as a media player for multimedia content.

In a first embodiment, the personal archive device is a secured storage device that can be coupled to another device, such as a personal computer, set-top box, player, and the like. When a multimedia content medium has been inserted, for example, a disc being inserted in a DVD drive or BD drive of the computer or player, a registration process on the computer may be initiated to allow the user to obtain an authorized version of the content on the disc for archival in the secured storage of the personal archive device. Using the registration process, the user may register the content with a registration service over a network, such as the Internet. Upon registration, the personal archive device is allowed to download and store a same or similar version of the multimedia content as an authorized version into its secured storage. Such authorized versions of the multimedia content may be downloaded from one or more content sources or content providers over the network. In some embodiments, the registration process may be initiated based on one or more criteria, such as an authenticity check of the inserted medium, payment of a fee, a user request, and/or the like. The personal archive device is also configured to preserve, anonymously if necessary, the digital rights management scheme of the multimedia content.

The personal archive device thus can be a device containing all of a user's content in one convenient archive. In some embodiments, the personal archive device comprises its own secured storage, such as a hard drive. In other embodiments, the personal archive device is coupled to one or more storage devices, such as one or more network attached storage devices or detachable, portable storage devices, for example, for use with display devices in various rooms. In yet other embodiments, the personal archive device is a portable device having its own secured storage.

In the embodiments, binding the content to the personal archive device and its secured storage provides strong copyright and digital rights management protection capabilities. For example, the embodiments allow content to be recorded on a hard disk drive in a secure manner that preserves the digital rights management and copy protections desired by the content owners and content providers. In addition, the authorized version of the content is bound to a specific portable archive device, for example, using various security techniques, such as encryption, etc. This feature ensures content providers, among others, that the authorized versions of content are being distributed legitimately and that the personal archive devices are being used legitimately. The personal archive device can be connected through a variety of wired or wireless connection options to other devices and services, such as the registration service or content source.

The embodiments provide various advantages to content owners and may allow these owners to obtain an additional revenue stream from current DVD and BD customers and through renewed back catalog sales. In one embodiment, DVD owners are allowed to download authorized versions of their DVD content into their personal archive device by registering the content. Upon registration and verification of the content, the user is then permitted to retrieve an authorized version and download it on the personal archive device, for example, by downloading from a content source or from one or more content providers, such as CinemaNow. As noted, the personal archive device can be secured storage device coupled to another device, a stand-alone device, such as a portable device. In addition, the personal archive device may have its secured storage as a hard disk drive, a NAS drive, or a combination thereof. The personal archive device provides various features to preserve the digital rights management of the content and to prevent unauthorized copying.

The personal archive device effectively aggregates the personal and premium content into a single archive with its secured storage. The archive can be accessed and, if desired, portable to the user. In addition, the embodiments may offer content providers a revenue stream from users who have previously purchased content without cannibalizing their current revenue streams. For example, in some embodiments, the registration process may be utilized to collect and aggregate marketing and profile data regarding the multimedia content purchases of users.

In some embodiments, the users may be charged a fee to obtain an authorized version. For example, this fee may be an amount that is a fraction of the cost of the original purchase of a DVD or BD. However, because information about the movie interests of users may be considered an important marketing tool, among other things, the registration process of the embodiments may be offered for free and simply require the disclosure of certain information, such as basic identification information and demographic data. In some embodiments, the registration service comprises automatic segmentation algorithms for determining movie content and user recognition combined with geographic indexing.

In addition, the users may be offered other variations of the content based on a fee. For example, the user may be offered the ability to upgrade their content, e.g., to a higher resolution or different format for a fee. In particular, the user may be offered the option of upgrading content on a DVD up to BD quality or other higher resolution. The fees charged in the embodiments may vary depending on the other criteria, such as whether the user is requesting an authorized version that is of the same quality that they currently own or of lesser quality, such as a version for a mobile device. The embodiments can support a variety of pricing schemes for providing authorized versions of content.

Figure 1A:
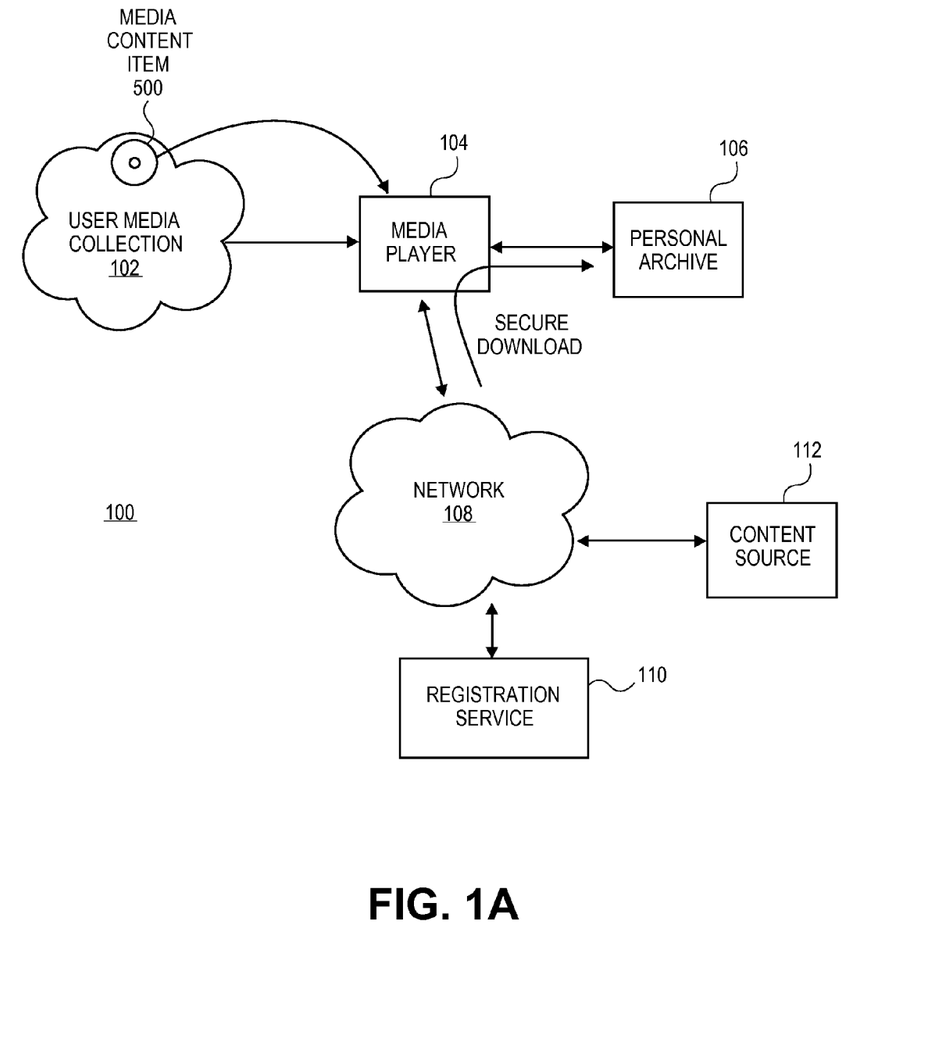
FIGS. 1A-1C show block diagrams of exemplary systems that are consistent with the present disclosure.
Figure 1B:
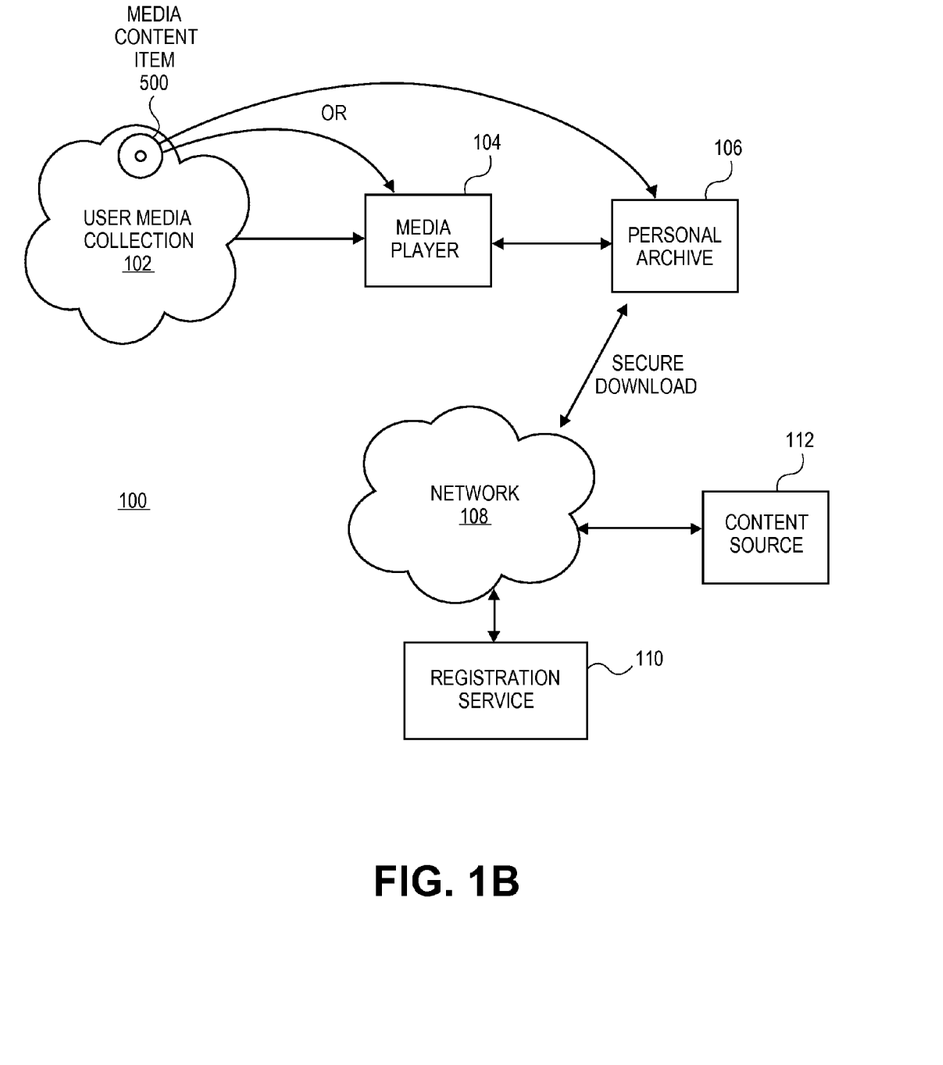
Figure 1C:
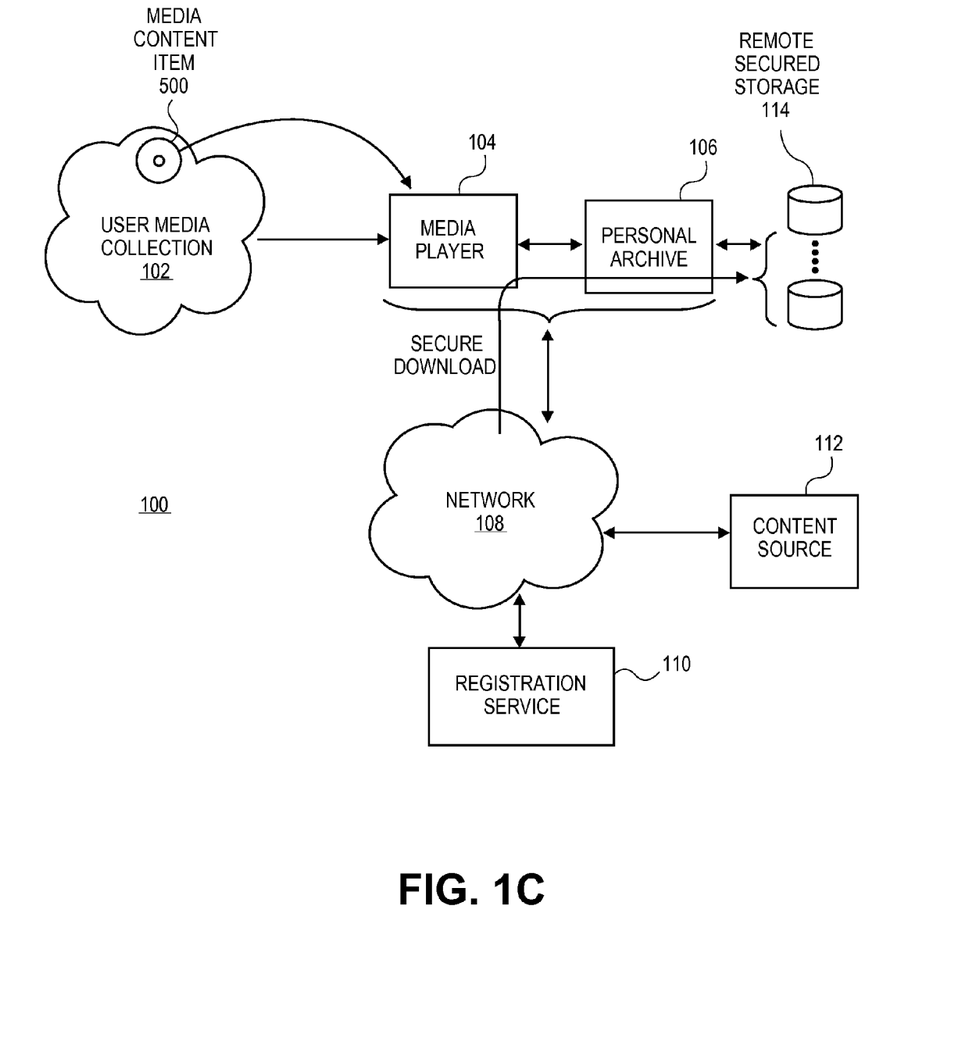

FIGS. 1A-1C show an exemplary system 100 that is consistent with the present disclosure. As shown, a user may have a collection 102 of multimedia items that he or she may wish to consolidate into a single archive. System 100 may comprise one or more media players 104, a personal archive device 106, a network 108, a registration service 110, and one or more content sources 112. These components will now be described below.

User media collection 102 represents the digital multimedia content of a user. For example, a user may have content, such as movies on DVD or BD. Of course, the user may have other items in his or her collection 102, such as music, computer games, e-books, etc., in a wide array of digital and analog content formats and media. These formats may range from VHS tape, phonographs, CDs, DVDs, BDs, hard drives, iPods, iPads, mobile phones, MP3 players, digital TVs with set top boxes, USB memory sticks, compact flash cards, digital video tape, and the like. As will be described further, the embodiments of the present disclosure allow the user to obtain authorized versions of their multimedia content and access it in a more convenient manner. For example, for purposes of illustration, the present disclosure describes obtaining authorized versions of multimedia content that has been distributed on physical medium, such as a DVD or BD. However, the embodiments can relate to a variety of devices and processes for obtaining authorized versions of content in a user's multimedia collection 102.

Media player 104 represents any of a wide variety of devices that are capable of displaying and playing multimedia content. For example, the media player 104 may be a personal computer, a laptop computer, etc. Alternatively, the media player 104 may be a television, a DVD player, BD player, and the like. Moreover, media player 104 may be implemented as other kinds of devices, such as iPods, iPads, mobile phones, MP3 players, and the like.

Personal archive device 106 serves as a device through which a user can aggregate their multimedia content and obtain authorized versions of their content. In a first embodiment, the personal archive device 106 comprises a secured storage and associated storage controller hardware, firmware, and software. In such an embodiment, personal archive device 106 is configured so that it can be easily coupled to another device, such as media player 104. For example, the personal archive device 106 may comprise various wired and wireless interfaces, such as USB, Firewire, Bluetooth, WiFi, WiMax, etc., through which it connects to another device, such as a general-purpose computer or set-top box. For example, as shown in FIG. 1A, personal archive device 106 is coupled to media player 104. Accordingly, personal archive device 106 may rely on that device's connections to network 108 to communicate in system 100. This other device, e.g., media player 104 may also execute a registration program and other software to support the methods of the embodiments in which authorized versions of content are downloaded on to personal archive device 106. For example, the personal archive device 106 can be implemented to comprise a portable content container. An exemplary portable content container is described in co-pending U.S. patent application Ser. No. 12/646,927 entitled, "Portable Content Container Displaying A/V Files in Response to a Command Received from a Consumer Device," which is herein incorporated by reference in its entirety. In this embodiment shown in FIG. 1A, the media player 104 is configured to pass through, without tampering, the download of the authorized version of a content item 500 from a user's media collection 102. For example, the media player 104 may be configured by software or other security mechanism to simply pass streaming data for the authorized version without decrypting it or without creating a copy of the authorized version. Instead, the authorized version is securely downloaded transparently through media player 104 to the personal archive device 106 and its secured storage.

FIG. 1B shows another embodiment of the present disclosure. In particular, as shown in FIG. 1B, the personal archive device 106 may be a device that comprises capabilities in addition to its secured storage. For example, personal archive device 106 can be configured as a stand-alone device, if desired, or as a companion device, for example, to media player 104. Indeed, as shown in FIG. 1B, personal archive device 106 may comprise its own network interface to network 108 and communicate directly with registration service 110 and content source 112. In these embodiments, the personal archive device may thus download the authorized version of a content item 500 directly through its own network communications to network 108.

However, as shown, the process of obtaining an authorized download of the content item 500 may be triggered in various ways. For example, the request for an authorized download may be initiated when a user inserts a DVD or BD into media player 104, which is otherwise coupled to the personal archive device. This insertion of the content item 500 may thus trigger the personal archive device 106 to directly obtain the authorized version. Alternatively, the personal archive device 106 may itself be capable of accepting the content item 500, e.g., in its own drive. This insertion may also cause the personal archive device 106 to request and to download the authorized version from the content source 112.

In yet other embodiments, personal archive device 106 may be a self-enclosed device to make it relatively portable for the user. For example, in addition to an enclosed secured storage, such as an internal hard disk drive, the personal archive device 106 may comprise a display, user input, such as a keyboard, and optical drives for a DVD or BD.

Regardless of whether it is a companion or stand-alone device, the personal archive device 106 may comprise a secured storage (not shown in FIGS. 1A and 1B). This secured storage may be implemented as one or more hard disk drives.

Alternatively, as shown in FIG. 10, the personal archive device 106 may be configured to work with secured storage that is remote. For example, as shown, the personal archive device 106 may be coupled to one or more remote, network attached secured storage devices 114 or other type of storage. As shown, the authorized version may be provided via a secured download passing through media player 104. Of course, the personal archive device 106 (in similar fashion shown in FIG. 1B) may directly download the authorized version from the content source 112 via its own network interface to network 108. The remote secured storage devices 114 may be coupled to the personal archive device 106 via a local interface, or local area network. Alternatively, the remote secured storage 114 may be coupled to the personal archive device 106 remotely via a network, such as network 108. Of course, the personal archive device 106 may employ other forms of storage, such as a solid-state drive, hybrid drive, and/or the like. In these embodiments, the personal archive device 106 may be configured with additional security measures to protect the transmission of the data for the authorized version. For example, the personal archive device 106 may encrypt its communications or use a secure communication path, such as HDMI, when interfacing with the remote secured storage 114.

The personal archive device 106 may comprise various interfaces to connect to other devices, such as media player 104. For example, the personal archive device 106 may comprise interfaces, such as, USB, SPDIF, S-Video output, RCA, HDMI, etc. In addition, the personal archive device 106 may support various display standards, such as PAL and NTSC, and resolutions, such as standard definition and high definition at 480p, 576p, 720p, 1080i, 1080p, etc.

Personal archive device 106 may be configured to support various playback formats, such as, AVI, ISO, VOB, Xvid, MPEG, DivX, Quicktime, and the like. In addition, personal archive device 106 is configured to support various operating systems, such as Microsoft Windows, Apple OSX, Linux, etc., and also supports the relevant interface standards they operate with, such as USB, IEEE 1394, HDMI, etc.

Network 108 represents the communication infrastructure for system 100. For example, network 108 may comprise various local area and wide area networks. In addition, network 108 can comprise both voice and data networks known by those skilled in the art. In some embodiments, network 108 comprises the Internet. Of course, network 108 may represent other networks that couple the components of system 100.

Registration service 110 refers to the devices and systems for registering the content from user media collection 102. In particular, the registration service 110 serves as an authorization or licensing entity for users to obtain authorized versions of content from media collection 102.

In particular, the registration service 110 may provide authorized versions that are protected by a digital rights management scheme. Digital rights management scheme may refer to any of a wide variety of access control technologies that may be enforced in hardware, for example in personal archive device 106, in software, or a combination thereof. An authorized version is protected by a digital rights management scheme, and thus, the uses of the authorized version may be inhibited by the content provider or content's source.

Content source 112 refers to the devices and systems that provide authorized versions of content to personal archive device 106. For example, content source 112 may be a file server or website on the Internet. In other embodiments, content source 112 may refer to a collection of devices operating together, such as in a peer-to-peer network.

In some embodiments, various content sources 112 used by the registration service 110 may be approved or authenticated to ensure that authorized versions originate from a trusted source. For example, content sources 112 may also present various authentication credentials, such as a digital certificate, and the like when offering authorized versions to personal archive device 106 or media player 104.

Figure 2:
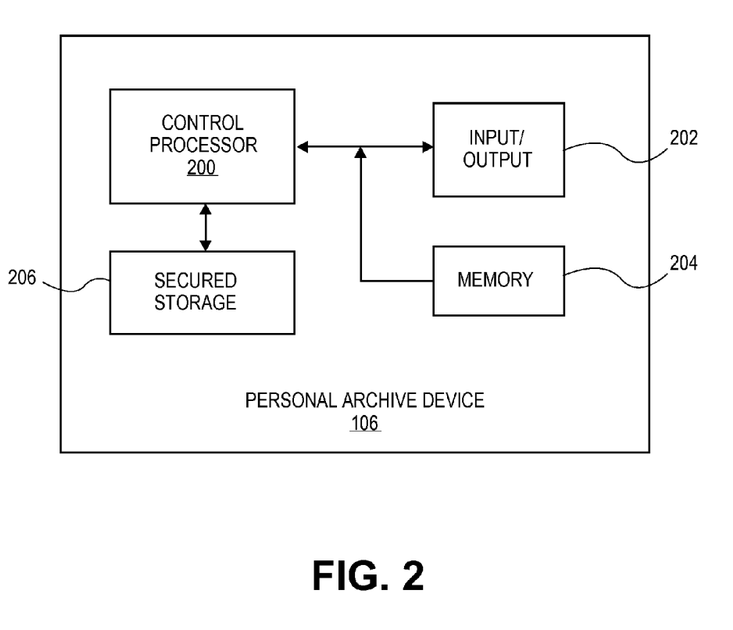
FIG. 2 shows a block diagram of an exemplary personal content archive device in accordance with an embodiment of the present disclosure.

FIG. 2 shows an exemplary personal content archive device 106 in accordance with an embodiment of the present disclosure. As shown, personal archive device 106 may comprise a control processor 200, and input/output 202, a memory 204, and secured storage 206. These components will now be described to illustrate the principles of the present disclosure and the embodiments.

Control processor 200 represents the logic and circuitry that carries out the storage control functions of personal archive device 106. For example, control processor 200 may be general purpose CPU, such as those made by Intel Corporation. Alternatively, control processor 200 may be implemented using other forms of processors and circuitry. For example, control processor 200 may be implemented based on a field-programmable gate array (FPGA) or application specific integrated circuit (ASIC).

Input/Output 202 serves as the communications interface for personal archive device. For example, input/output 202 may comprise interfaces, such as SCSI, USB, IEEE 1394, Fireware, eSATA, HDMI, and the like to allow personal archive device to connect to other devices, such as media player 104, and to network 108.

Memory 204 serves as a temporary storage memory for personal archive device. For example, memory 204 may serve as the storage for instructions being executed by control processor 200. Memory 204 may be implemented using various types of memory both volatile and non-volatile. For example, memory 204 may be implemented using RAM, DRAM, RAM, ROM, PROM, EPROM, EEPROM, flash memory, etc.

Secured storage 206 is a storage medium of personal archive device 106. The secured storage 206 provides a controlled environment in which the authorized version is protected by a digital rights management scheme and various other copy protections. For example, the secured storage 206 may employ various copy protection methods. For example, the secured storage 206 may bind its contents to the personal archive device using some unique feature, such as a serial number from memory 204, MAC addresses, etc. In various embodiments, the secured storage 206 may be implemented as one or more hard disk drives, such as those made by Western Digital Technologies. Content may then be locked to such secured storage 206 through a fingerprinting of secured storage 206. The fingerprinting may be accomplished through spectral signatures of a secured storage 206 drive or through drive defect signatures. For example, content locking features are described in U.S. Pat. No. 6,799,274 entitled "Device Comprising Encryption Circuitry Enabled by Comparing an Operating Spectral Signature to an Initial Spectral Signature," to Hamlin, which is herein incorporated by reference in its entirety.

Figure 3:
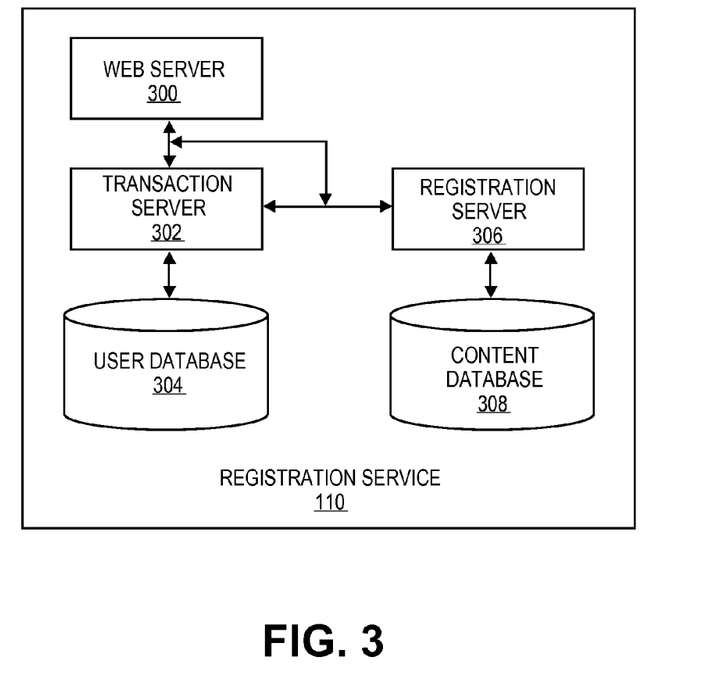
FIG. 3 shows a block diagram of an exemplary registration service in accordance with an embodiment of the present disclosure.

FIG. 3 shows an exemplary registration service 110 in accordance with an embodiment of the present disclosure. As shown, the registration service 110 may comprise a web server 300, a transaction server 302, a user account database 304, and a content database 308. These components may be implemented using known hardware, firmware, and software that is shared or dedicated to them. For example, these components may be implemented on one or more machines executing the servers as software. Alternatively, the components of registration service 110 may be implemented on a collection of machines that are local or remote to each other.

The components of registration service 110 may be coupled together in various ways. For example, these components may be devices connected together via bus, a local area, or wide area network. In addition, these components may communicate with each other using known protocols and standards, such as HTML, CGI, CORBA, Java, etc. For example, the components of registration service 110 may employ Service Oriented Architecture (SOA) web services in order to interface with each other. These components will now be briefly described.

Web server 300 serves as the front-end interface for registration service 110 and provides information to other components of registration service 110. In particular, web server 300 may provide an interface that is accessible via personal archive device 106 or media player 104 over network 108. Web server 300 may be implemented using well-known hardware and software. In addition, web server 300 may support well known standards, such as HTML, CGI, etc. in order to communicate within system 100. Furthermore, the web server 300 may permit the personal archive device 106 to interface with other types of web services, such as social networks. For example, a user of the personal archive 106 may desire to post portions, such as one or more scenes, from the authorized versions of their multimedia content. In particular, a user may wish to post scenes from a movie showing a certain locale or city to accompany the user's photos from a vacation. The permissions to allow such posting from the authorized version may be allowed or disallowed depending on the digital rights granted to the user when obtaining the authorized version.

Transaction server 302 processes the request for an authorized version by a user. Such components are known to those skilled in the art. For example, transaction server 302 may maintain an inventory of the user media collection 102, a history of transactions by a user, and maintain an account for users, such as logins, passwords, financial information, and the like. In addition, the transaction server 302 may obtain and track data concerning each individual content item, such as media identifications (MIDs) of a DVD, or unique identification codes assigned to BDs. Such tracking may be useful in order to ensure that one or a small group of users can only obtain a certain number of authorized versions for given content item, if desired.

User account database 304 provides an organized repository for user transactions and history with registration service 110. For example, user account database 304 may be implemented using conventional database management systems to allow registration service 110 to create, maintain, search, and access information about a user and the user's media collection 102. In addition, user account database 304 may support various querying languages, such as SQL, MySQL, and the like.

In some embodiments, user account database 304 may provide various demographic and aggregated data. For example, user account database 304 may comprise data that profiles the users of system 100. Such data may include user age, gender, purchase history, genres of movies registered, location data, etc.

Registration server 306 controls registration of an item of content and providing an authorized version of the content. For example, in some embodiments, registration 306 functions to identify the item of content and to enforce one or more rules and policies in determining whether to allow an authorized version. Registration server 306 may make its determinations based on a wide variety of factors.

For example, for DVDs, the registration server 306 may evaluate the media identification code (MID) on a DVD to determine an authorized version. Registration server 306 may also perform various processes to individually identify a particular content item. For example, registration server 306 may perform spectral analysis on data from a DVD or query transaction data indicating when and where the DVD was obtained in order to identity it. As another example, registration server 306 may request input from the user regarding when and where a DVD was obtained.

As another example, for BD, the registration server 306 may analyze the various digital rights management information, such as AACS, BD+, and/or BD-ROM mark, to evaluate a particular BD and to determine whether to allow an authorized version. For example, a particular BD may become associated with the first user to register it or use it with an embodiment of the presently described systems and methods. Subsequent attempts to use the same BD for authentication in accordance with an embodiment of the present system or method may result in denied authorization or authorization only for the same user.

Content database 308 comprises the hardware and software for providing an organized repository for identifying content and locating authorized versions. For example, content database 308 may be implemented using conventional database management systems to allow registration service 110 to create, maintain, search, and access information about content and its authorized versions. In some embodiments, the content database 308 comprises a wide variety of information about content, such as the content's title, release data, genre, MPAA rating, listing of cast and actors, director, etc. In addition, the content database 308 may comprise other information or be linked to other databases to determine related content. This related content may also be included in or accompany the authorized version offered by registration service 110.

In some embodiments, registration service 110 may collect information about the content it registers and may further provide recommendations as an aid to the user. For example, registration service 110 may comprise software and logic to determine authorized versions of content that the user may find interesting based on their history of registrations or based on the content that is the subject of registration. Alternatively, registration service 110 may interface with other services, such as IMDb, Jinni, to determine authorized versions and recommendations.

Figure 4:
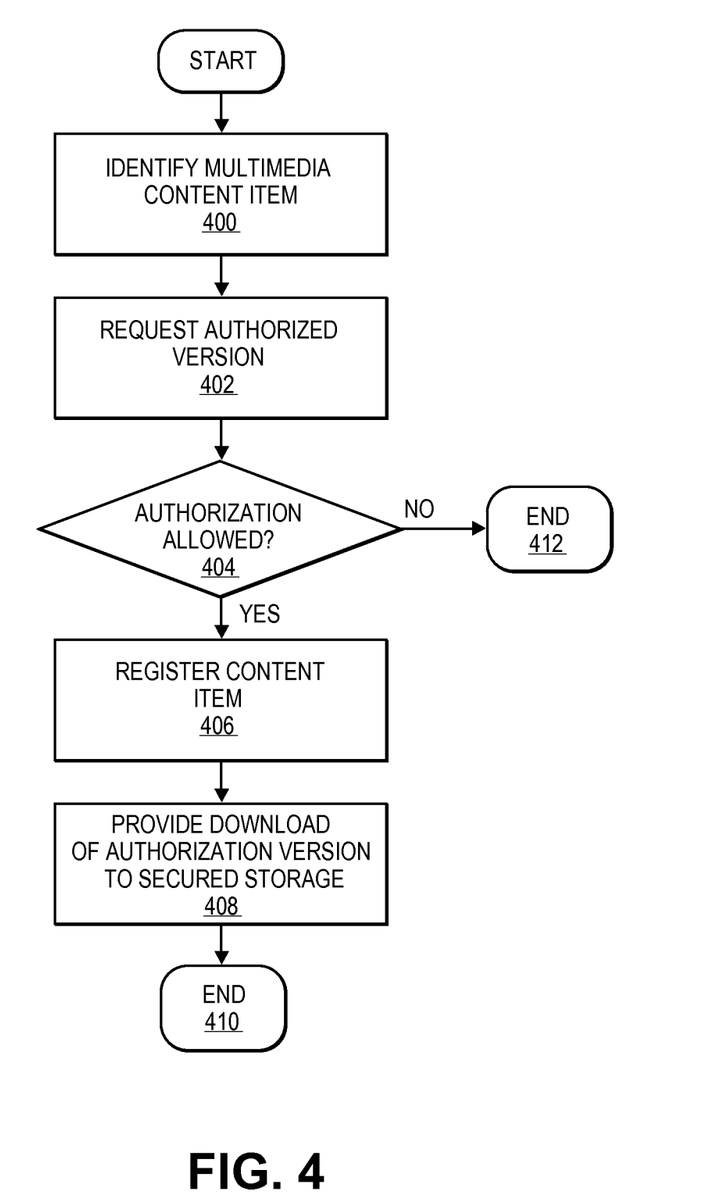
FIG. 4 shows an exemplary process flow for obtaining an authorized version of multimedia content in accordance with the present disclosure.

FIG. 4 shows an exemplary process flow in accordance with an embodiment of the present disclosure. In general, the process relates to detecting when a content item, such as a DVD or BD, has been inserted into a media player. The registration process then involves the exchange of information with the registration service 110, either automatically from the media player or personal archive device, or interactively with input by the user. The registration service 110 makes an authorization determination, and in some embodiments, may request and process a payment. The registration service 110 then authorizes and provides the relevant information for downloading an authorized version. For purposes of illustration, the process flow is described in relation to a user obtaining an authorized version of content from a DVD or BD.

At stage 400, the system 100 identifies the multimedia content item for which an authorized version is requested. For example, the process may be initiated automatically when the user inserts a DVD or BD into media player 104. As another example, the user may be accessing registration service 110 via network 108 and request an authorized version of a multimedia content item. Registration service 110 may then prompt the user to insert the relevant DVD or BD into media player 104 or personal archive device 106.

The content on the DVD or BD may be identified and analyzed to various extents by media player 104 or personal archive device 106. For example, in one embodiment, the media player 104 executes a software application so that a DVD or BD may be individually identified based on various processes. In particular, each BD can be identified based on its metadata. As another example, a DVD can be individually identified based on its MID and by performing a spectral analysis of the DVD.

Individual identification of the content item may be relevant to the registration process, for example, to ensure that the user has legally or legitimately obtained ownership of the DVD or BD, rather than, e.g., merely obtained temporary access such as through rental services or borrowing from friends, etc. Individual identification may also be useful to ensure that only a single user or a small group of users are permitted to download authorized versions of the content item. The content providers, content source 112, or registration service 110 may configure such permissions. As another example, individual identification of the content item may be relevant to ensure that a user does not repeatedly request authorized versions of the content, intentionally or unintentionally.

Various DVDs and BD may be prohibited from having authorized versions. For example, DVDs and BDs that have been distributed for rental, such as via NetFlix, Blockbuster, RedBox, and the like, may be tagged such that a user is not permitted to obtain an authorized version based on presenting that particular DVD or BD. Alternatively, the registration service 110 may recognize the multimedia content item as being from a rental organization and act accordingly, such as charging a higher fee for ownership of an authorized version or download, providing a warning message, etc.

In stage 402, the personal archive device 106 submits the identification information for the content item and requests an authorized version of the content. In particular, the personal archive device 106 may establish communications over network 108 with registration service 110. For security purposes, the personal archive device 106 may have to perform various authentication tasks, such as providing a user login and password entered by the user, or credentials unique to the personal archive device, such as device id, etc.

When requesting the authorized version of the content, the user may be offered a variety of options. These options may be presented via an interface on media player 104, such as a display on a television or a menu on a computer display, or on a display of personal archive device 106 (if personal archive device 106 comprises a user interface). For example, the user may be offered a copy of the content as an authorized version. Alternatively, the user may be offered a variation of the content, such as an updated or upgraded version of the content, such as a special edition, or director's cut of the content, deleted scenes, alternative endings, etc.

In addition, the registration service 110 may offer related content as part of an authorized version. For example, the registration service 110 may determine one or more recommended items, such as similar movies, itself or by querying a recommendation engine, such as Jinni, Movielens, etc.

In stage 404, the registration service 110 checks if an authorized version is allowed or permitted for the requested content item. The policies and rules for allowing an authorized version can depend on a variety of criteria. For example, as noted above, certain individual DVDs or BDs may be restricted. As another example, a user may be tagged as someone who has violated the terms of digital rights management of content. As yet another example, the registration service 110 may limit authorized versions of content based on a date or time. Registration service 110 can be configured to enforce a wide variety of policies and rules regarding whether to allow an authorized version.

If an authorized version is allowed, then processing continues to stages 406 to 410. Alternatively, if an authorized version is not allowed, then processing ends at stage 412. The registration service 110 may provide a message or error notice back to media player 104 or personal archive device 106 for informational purposes in these circumstances.

Referring now to stage 406, the content item has been identified and allowed an authorized version. Accordingly, registration service 110 proceeds with registering the content item. In particular, registration server 306 may query content database 308 and locate an authorized version that can be downloaded. The registration server 306 may also notify various entities, such as the content's owner and content source 112—such as to provide permission to download content to that user's personal archive device, when a content item has been registered.

In addition, transaction server 302 of registration service 110 may record various sets of information and create a transaction for the authorized version. For example, the transaction server 302 may request and process a payment from the user for the authorized version. The transaction server 302 may also record other information, such as the user's identification information, time, date, and information about the content item. This may include the spectral analysis fingerprint or other unique identifying characteristic. With such information, the transaction server may disallow authentication when the same unique fingerprint is used to request authorized versions for a different user, or when the same user has previously requested authorized versions of the same content multiple times.

In stage 408, the authorized version is provided to the personal archive device 106. For example, upon registration, the registration server 110 may provide download information, such as URLs or other data, to indicate where personal archive device 106 can download the authorized version of content. Of note, the authorized version may be downloaded from one content source or multiple content sources, such as a peer-to-peer network. In some embodiments, the secured storage 206 may employ various copy protection techniques to deter unauthorized copying. For example, the embodiments may employ techniques, such as digital watermarking, encryption, etc. For example, U.S. patent application Ser. No. 12/369,708 entitled "Simple Non-Autonomous Peering Environment, Watermarking and Authentication," describes an example of such techniques that may be used by the embodiments and is herein incorporated by reference in its entirety. In some embodiments, various techniques, such as watermarking of the content in secured storage 206 may be employed to bind or lock the content to a specific personal content archive 106. For example, a watermark or other technique to bind the content to the personal content archive 106 may be derived from unique characteristics, such as MAC address, bad sectors, etc., of a hard disk drive used in secured storage 206. Of course, the embodiments may employ other security measures, such as encryption, and other metadata techniques to deter or detect tampering of the authorized versions.

In stage 410, personal archive device 106 downloads the authorized version of the content into its secured storage 206 and processing ends. For informational purposes, the personal archive device 106 may provide various indications when the authorized version has been obtained. For example, the personal archive device 106 may display a message or have a message displayed on media player 104.

Of note, in some circumstances, the personal archive device 106 may restrict playback of the authorized version until the download is complete. However, in other circumstances or embodiments, the personal archive device 106 may allow playback of the authorized version during download, such as, in a streaming manner.

Figure 5:
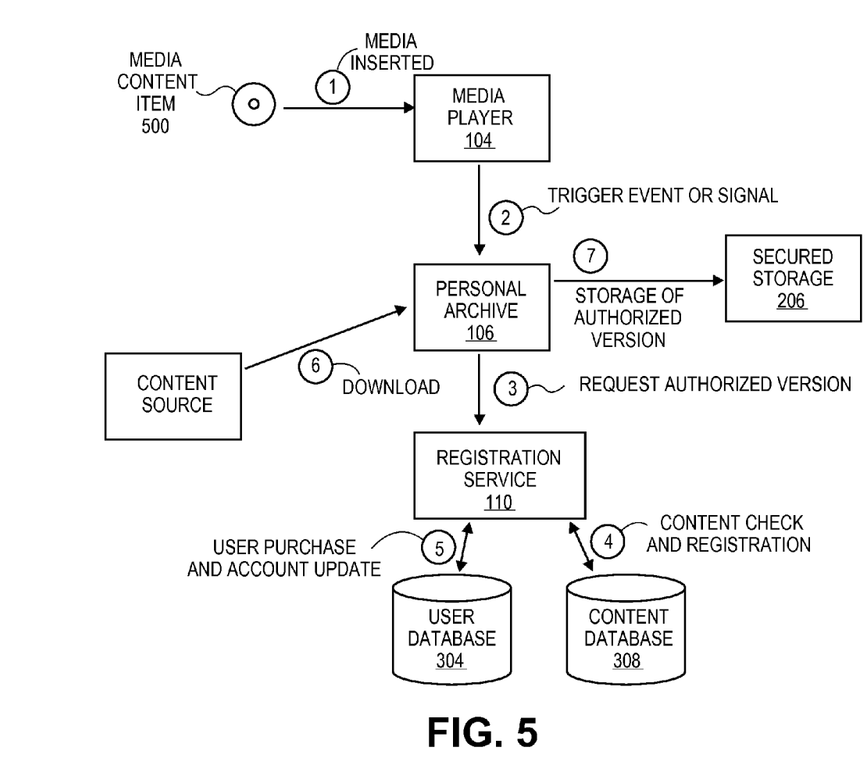
FIG. 5 shows another exemplary process flow in accordance with an embodiment of the present disclosure.

FIG. 5 shows another exemplary process flow in accordance with an embodiment of the present disclosure. In particular, FIG. 5 is provided to illustrate a registration process and obtaining an authorized version of content within system 100 shown in FIGS. 1A-1C.

As shown, first, the user may insert a media content item, such as a DVD or BD into media player 104. In response, second, the media player 104 may send a trigger event or signal to registration service 110 to request download of an authorized version of content to personal archive device 106.

Third, the media player 104 may analyze and identify the content item 500 and send a request to registration service 110. For example, the media player 104 may execute various software applications that analyze the content item 500. In addition, in some embodiments, the media player 104 may request information from the user, such as demographic information or information about the content item 500 to support the request for an authorized version.

Fourth, upon receiving the request, the registration service 110 may query its content database 308. During this check, the registration service 110 may determine various things, such as whether content item 500 is allowed an authorized version, and the location of one or more content sources 112 for the content item 500.

Fifth, the registration service 110 may perform other transactions, such as requesting and processing a payment from the user. The registration service 110 may also maintain various sets of information in a record for the user in user database 304.

Sixth, content source 112 provides the authorized version to personal archive 104, for example, via network 108. Content source 112 may provide the authorized version automatically, for example, upon an instruction or command from registration service 110. Alternatively, content source 112 may wait to provide the authorized version upon a request from media player 104 or personal archive device 106.

Finally, seventh, the personal archive device 106 stores the authorized version in its secured storage 206. As noted, the personal archive device 106 and secured storage 206 preserves the digital rights management of the authorized version, for example, to prevent unauthorized copying.

Other embodiments will be apparent to those skilled in the art from consideration of the specification and practice of the embodiment disclosed herein. For example, the registration service and content sources may be combined as a single service. Alternatively, the registration service may offer a plurality of content sources for content that is being registered. It is intended that the specification and examples be considered as exemplary only, with a true scope and spirit of the embodiment being indicated by the following claims.

What is claimed is:

1. A personal content archive device configured to consolidate multimedia content for a user, said personal content archive device comprising:
    an input interface configured to:
        detect input of a data storage medium storing multimedia content;
        generate a signal indicating that the data storage medium has been inputted; and
        retrieve data, including at least part of the multimedia content, stored on the data storage medium;
    a non-volatile memory device;
    a secured storage configured to protect stored information based on at least one digital rights management scheme;
    a network interface configured to communicate with a remote server over a network, wherein:
        the server is configured to selectively register the data storage medium and provide an authorized version of the multimedia content, and
        the authorized version of the multimedia content is different from the multimedia content stored on the data storage medium; and
    a processor configured to:
        detect input of the data storage medium based on the signal generated by the input interface;
        identify the multimedia content stored on the data storage medium;
        send, to the server over the network interface, authorization data associated with the multimedia content stored on the data storage medium;
        cause verification of the authorization data by the server and, responsive to successful verification of the authorization data, registration of the data storage medium with the server;
        in response to determining successful verification of the authorization data and registration of the data storage medium:
            request, from the server over the network interface, download of the authorized version of the multimedia content;
            download, from the server over the network interface, the authorized version of the multimedia content;
            store at least part of the authorized version of the multimedia content in the non-volatile memory device;
            store the authorized version of the multimedia content in the secured storage; and
            delete or render inaccessible the at least part of the authorized version of the multimedia content stored in the non-volatile memory device in response to the at least part of the authorized version of the multimedia content being stored in the secured storage; and
        in response to determining failed verification of the authorization data, provide an error indication to the user.

2. The personal content archive device of claim 1, wherein the input interface comprises a digital video disk ("DVD") drive or a blu-ray disc ("BD") drive.

3. The personal content archive device of claim 1, wherein the secured storage is configured to protect stored information using at least one of encryption, digital watermarking, or fingerprinting.

4. The personal content archive device of claim 1, wherein the secured storage is a network attached storage device.

5. The personal content archive device of claim 1, wherein the network interface is a wireless or wired interface that is configured to communicate with the server.

6. The personal content archive device of claim 1, wherein the authorized version of the multimedia content is different from the multimedia content stored on the data storage medium at least in that the authorized version of the multimedia content and the multimedia content stored on the data storage medium are protected by different digital rights management schemes.

7. The personal content archive device of claim 2, wherein the authorization data comprises a media identification code of the data storage medium configured to identify a manufacturer of the data storage medium.

8. The personal content archive device of claim 1, wherein the processor is configured to cause registration of the data storage medium further based on information from an account for a user.

9. The personal content archive device of claim 1, wherein:
    the input interface comprises a blu-ray disc ("BD") drive; and
    the authorization data comprises data associated with at least one of Advanced Access Content System (AACS), BD+, or BD-ROM mark.

10. A system of consolidating content of a user onto a personal content archive device, said system comprising:
    a registration server configured to register a storage medium storing multimedia content that has been obtained by a user responsive to the server verifying authorization data associated with the multimedia content; and
    a personal content archive device comprising a non-volatile memory device and at least one processor configured to, upon detecting input of the storage medium on which multimedia content has been stored:
        identify the multimedia content stored on the storage medium and the authorization data associated with the multimedia content,
        request registration of the storage medium with the registration server in response to providing to the registration server the authorization data associated with the multimedia content stored on the storage medium, in response to receiving an indication from the registration server of successful registration of the storage medium:
    request, from the registration server, download of an authorized version of the multimedia content different from the multimedia content stored in the storage medium,
    download the authorized version of the multimedia content at least partially to the non-volatile memory device,
    store the authorized version of the multimedia content in a secured storage coupled to the personal content archive device, and
    delete or render inaccessible the at least part of the authorized version of the multimedia content downloaded to the non-volatile memory device in response to the at least part of the authorized version of the multimedia content being stored in the secured storage; and
in response to receiving an indication from the registration server of failed verification of the authorization data, provide an error indication to the user.

11. The system of claim 10, wherein the authorization data comprises volume information configured to identify a manufacturer of the storage medium.

12. The system of claim 10, wherein the authorized version of the multimedia content and the multimedia content stored on the data storage medium are protected by different digital rights management schemes.

13. The system of claim 10, wherein the at least one processor of the personal content archive device is configured to:
    detect insertion of a digital video disk ("DVD") or a blu-ray disc ("BD") storing multimedia content; and
    retrieve data stored on the DVD or the BD.

14. The system of claim 10, wherein the at least one processor of the personal content archive device is configured to protect the multimedia content stored in the secured storage based on at least one digital rights management scheme.

15. The system of claim 10, wherein the at least one processor of the personal content archive device is configured to download the multimedia content from a content provider in response to the registration server registering the storage medium.

16. A method of transferring multimedia content from a medium to a personal archive device, said method comprising:
    detecting an input of a data storage medium that has been obtained by a user;
    in response to detecting the input, identifying multimedia content stored on the data storage medium and authorization data associated with the multimedia content stored on the storage medium;
    over a computer network, communicating to a registration server the authorization data associated with the multimedia content and causing registration of the multimedia content with the registration server responsive to the registration server verifying the authorization data associated with the multimedia content; and
    in response to receiving an indication from the registration server that the multimedia content has been successfully registered:
        transmitting a request, to the registration server over the computer network, to download an authorized version of the multimedia content;
        downloading the authorized version of the multimedia content different from the multimedia content stored on the storage medium;
        storing at least part of the authorized version of the multimedia content in a non-volatile memory of the personal archive device;
        storing the authorized version of the multimedia content in a secured storage coupled to the personal archive device based on the registration of the multimedia content, wherein the authorized version stored in the secured storage is protected by a digital rights management scheme; and
        deleting or rendering inaccessible the at least part of the authorized version of the multimedia content stored in the non-volatile memory device in response to the at least part of the authorized version of the multimedia content being stored in the secured storage.

17. The method of claim 16, wherein detecting input of the data storage medium comprises detecting input of a digital video disk ("DVD") or a blu-ray disc ("BD") storing the multimedia content.

18. The method of claim 16, wherein the authorized version of the multimedia content is different from the multimedia content stored on the storage medium at least in that the authorized version of the multimedia content and the multimedia content stored on the data storage medium are protected by different digital rights management schemes.

19. A computing device comprising:
    an optical disk drive configured to:
        receive an optical disk storing data including multimedia content; and
        retrieve the data stored on the optical disk;
    a physical interface port for coupling with a data storage device, the data storage device including a secured storage configured to protect information based on at least one digital rights management scheme;
    a network interface configured to communicate with a remote registration server over a network; and
    controller circuitry comprising one or more processors and a non-volatile memory device storing instructions that, when executed by the one or more processors, cause the controller circuitry to:
        detect insertion of the optical disk into the disk drive; and
        in response to said detection:
            identify the multimedia content stored on the optical disk and authorization data associated with the multimedia content stored on the optical disk;
            provide a registration request to the registration server over the network using the network interface, the registration request comprising the authorization data associated with the multimedia content stored on the optical disk;
            in response to determining that the registration server successfully verified the authorization data associated with the multimedia content stored on the optical disk and registered the multimedia content, download an authorized copy of the multimedia content from the registration server;
            store at least part of the authorized copy in the non-volatile memory;
            store the authorized copy of the multimedia content in the secured storage of the data storage device using the physical interface port; and
            delete or render inaccessible the at least part of the authorized copy of the multimedia content stored in the non-volatile memory device in response to the at least part of the authorized copy of the multimedia content being stored in the secured storage.

20. The computing device of claim 19, wherein the authorized copy of the multimedia content and the multimedia content stored on the optical disk are protected by different digital rights management schemes.

21. The system of claim 13, wherein:
the authorization data comprises at least some data stored on the DVD; and
the registration server is configured to perform spectral analysis on the authorization data to verify a manufacturer of the DVD.

22. The system of claim 13, wherein the authorization data comprises data associated with at least one of Advanced Access Content System (AACS), BD+, or BD-ROM mark.

* * * * *